US007978452B2

(12) United States Patent
Hein

(10) Patent No.: US 7,978,452 B2

(45) Date of Patent: Jul. 12, 2011

(54) AUTOMOTIVE OVERCURRENT PROTECTION

(75) Inventor: David Anthony Hein, Sterling Heights, MI (US)

(73) Assignee: Lear Corporation, Southfield, MI (US)

(*) Notice: Subject to any disclaimer, the term of this patent is extended or adjusted under 35 U.S.C. 154(b) by 399 days.

(21) Appl. No.: 11/861,588

(22) Filed: Sep. 26, 2007

(65) Prior Publication Data

US 2009/0080130 A1 Mar. 26, 2009

(51) Int. Cl.
*H02H 3/08* (2006.01)
*H02H 5/04* (2006.01)

(52) U.S. Cl. ........................ 361/93.1; 361/93.8; 361/103

(58) Field of Classification Search ................. 361/93.1, 361/103

See application file for complete search history.

(56) References Cited

U.S. PATENT DOCUMENTS 4,032,876 A 6/1977 Burch
4,611,154 A 9/1986 Lambropoulos et al.
5,337,013 A 8/1994 Langer et al.
5,936,317 A 8/1999 Sasanouchi et al.
6,016,965 A * 1/2000 Yoshimura et al. ............. 236/35
6,055,145 A 4/2000 Lagree et al.
6,163,082 A 12/2000 Yoshida et al.
6,335,577 B1 * 1/2002 Baba ............................... 307/28
6,525,918 B1 2/2003 Alles et al.
6,577,138 B2 6/2003 Zuercher et al.
7,005,995 B2 * 2/2006 Hornsby et al. .............. 340/635
7,164,272 B1 1/2007 Borrego Bel et al.
7,342,762 B2 3/2008 Harris, IV
2006/0044727 A1 3/2006 Aboyade et al.
2006/0197508 A1 9/2006 Matsumoto et al.
2007/0093359 A1 4/2007 Kobayashi et al.

FOREIGN PATENT DOCUMENTS

DE 102004057119 A1 6/2006
DE 102006052135 A1 7/2007
EP 0762590 A1 3/1997
GB 2399688 A 9/2004
GB 2428301 A 1/2007
JP 11178193 A 7/1999

OTHER PUBLICATIONS

Freescale Semiconductor, Inc. Motorola Semiconductor Technical Data, Advance Information, Automotive Dual High Side Driver, Order No. MC 33286/D, Rev. 5.4, Jun. 2001 www.freescale.com.
Freescale Semiconductor, Advance Information, Document No. MC 33982B, Rev. 13.0, Jul. 2007, Single Intelligent High-Current Self-Protected Silicon High Side Switch.
Draft Copy, Double Channel High Side Driver with Analog Current Sense for Automotive Applications, VND5012A.
German Office Action for corresponding German Application No. 10 2008 026 737.6, mailed Sep. 17, 2009, 4 pages.
China Office Action for corresponding Application No. 2008101493265, mailed Mar. 16, 2011, 8 pages.

* cited by examiner

*Primary Examiner* — Jared Fureman
*Assistant Examiner* — Lucy Thomas
(74) *Attorney, Agent, or Firm* — Brooks Kushman P.C.

(57) ABSTRACT

Overcurrent is prevented in an automotive vehicle based on sensing at least one operating condition. An overcurrent threshold is determined based on characteristics of the load and on the sensed condition. If the sensed flow of current exceeds the determined overcurrent threshold, the flow of current to the load is interrupted. The sensed condition may be, for example, ambient temperature.

16 Claims, 3 Drawing Sheets

22
32
38
42 CURRENT SENSOR
40
PROCESSOR
34 SWITCH
36
46
28
TEMP SENSOR
COND SENSOR
44
48
24
30
26 LOAD
CURRENT
TIME
TEMPERATURE
20

AUTOMOTIVE OVERCURRENT PROTECTION

BACKGROUND OF THE INVENTION

1. Field of the Invention

The present invention relates to protecting wiring from excessive current in automotive vehicles 2. Background Art Automotive vehicles include a wide range of electrical devices powered by a battery, generator, alternator, fuel cell, and the like. These electrical devices vary in characteristics and functions. For example, automotive vehicles can include various lamps, heating elements, electrical motors, storage devices, electronic modules, powered sensors, and the like. Each electrical device is connected to a source of electrical power through wiring. This wiring must be correctly sized to supply current to the load over various operating conditions.

Current flowing through the wiring may exceed expected values due to various conditions such as, for example, a short circuit in the system, load failure, operation of the electrical device in an unexpected manor, alteration of the electrical device or unanticipated addition of electrical load by the operator, damage due to an accident involving the automotive vehicle, and the like. Under such conditions, excessive current in the wiring may cause the wiring to fail.

Often, wiring is the least capable component in an electrical system. Therefore, traditionally, wiring has been protected from excessive current by placing a fuse in the wiring circuit. One problem with a fuse is that, once it blows, it must be replaced, creating an inconvenience for the operator. Another problem with a fuse is that it is not adjustable for changes in operating conditions. Yet another problem is difficulty protecting from both short duration, high current events and long duration, low current events.

Recently fuses have been replaced by solid state switches. These switches may be reset following an episode of excessive current. Solid state switches have been packaged with current sensors, temperature sensors, current flow timers, and support electronics for determining when to interrupt the flow of current. However, these systems have not been responsive to changes in operating conditions and may suffer from an ability to handle different types of overcurrent events.

SUMMARY OF THE INVENTION

The present invention provides automotive overcurrent protection based on awareness of operating conditions.

In one embodiment of the present invention, a smart junction box is in series with a power source and an electrical load. The smart junction box includes a current sensor, at least one environmental sensor, and a controlled switch. Control logic determines an overcurrent threshold based on a type of load to which the load belongs and the sensed operating condition of the load. The switch interrupts the flow of the electrical current to the load if the sensed electrical circuit powering the load exceeds the determined overcurrent threshold. The environmental sensor may be, for example, a temperature sensor for sensing ambient temperature.

The control logic may permit resumption of the flow of the electrical current after a preset amount of time following the interruption of current. Attempts at permitting the resumption current may cease following a present number of interruptions. Moreover, the control logic may delay determining if the sensed electrical circuit exceeds the determined overcurrent threshold for an inrush time when the switch is first closed.

A method of preventing overcurrent in an automotive vehicle is also provided. At least one ambient condition is sensed. An overcurrent threshold is determined based on current draw characteristics of the load and on the sensed ambient condition. If the sensed flow of current exceeds the determined overcurrent threshold, the flow of current to the load is interrupted.

An automotive vehicle is also provided, including a source of electrical power, a load powered by the source of electrical power, and a wiring path for carrying a current between the source of electrical power and the load. A controlled switch is disposed in the wiring path. A current sensor senses the current and a temperature sensor senses temperature. The switch is closed to allow the current to flow. The magnitude of current flow is determined from an output of the current sensor. This magnitude is compared with a threshold current level based on the temperature, the time since the switch was closed, and a current-temperature relationship for at least a portion of the wiring path and the load. The switch is opened if the magnitude of the current is greater than the threshold current level.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
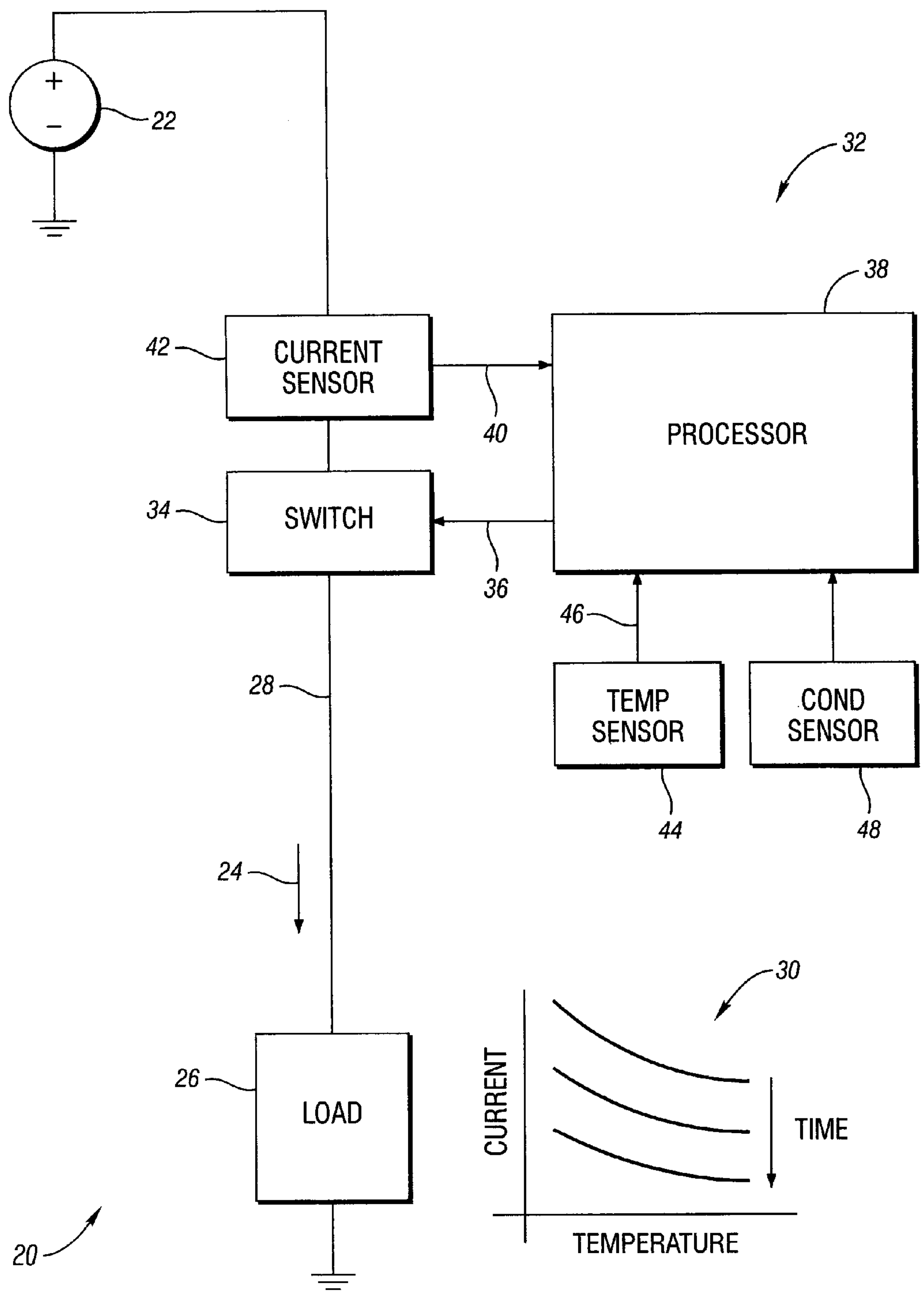
FIG. 1 is a block diagram illustrating a vehicular system according to an embodiment of the present invention.

Referring to FIG. 1, a block diagram illustrating a vehicular system according to an embodiment of the present invention is shown. An automotive system, shown generally by 20, includes at least one source of electrical power 22. Power source 22 may include one or more of a battery, alternator/generator, fuel cell, and the like. Power source 22 provides electrical current 24 to load 26 through wiring 28. Wiring 28 may include one or more conductors that are typically covered by insulation and can include solid conductors, multistrand conductors, flat flexible cables, and the like. As will be recognized by one of ordinary skill in the art, any type of wiring may be protected by the present invention. Moreover, all types of loads 26 may be used in the present invention, including motors, heating elements, lamps/lights, actuators, electronic modules, sensors, and the like. Various loads have different operating characteristics, with load 26 having a representative characteristic, shown generally by 30, indicating the magnitude of current 24 based on one or more variables, such as on time, ambient temperature, supply voltage, humidity, and the like.

Automotive vehicle 20 includes a smart junction block, shown generally by 32, which includes switch 34 operative to interrupt the flow of current 24 to load 26. Switch 34 is controlled by signal 36 from processor 38 based, in part, on input 40 from current sensor 42 which senses current 24.

Switch 34 and current sensor 32 may be implemented in a single package such as, for example, a VND5012A Double Channel High Side Driver With Current Sense for Automotive Applications provided by STMicroelectronics or a 33982B Single Intelligent High-Current Self-Protected Silicon High Side Switch from Freescale Semiconductor, Inc. Processor 38 also receives indications of ambient conditions. For example, temperature sensor 44 provides temperature signal 46 indicative of ambient temperature. Other ambient condition(s) may be sensed by additional sensor(s) 48.

During operation, processor 38 closes switch 34 based on, for example, user input requesting functionality provided by load 26. Processor 38 determines the amount of current 24 by monitoring or otherwise reading input 40 from current sensor 42. The amount of current 24 is compared with a threshold current level based on input from one or more ambient sensors 44, 48, a length of time since switch 34 was closed, and on one or more operating parameters such as load characteristics 30, capabilities of wiring 28, and the like. Processor 38 opens switch 34 if the amount of current 24 is greater than the threshold current level.

For clarity, only one switch 34 and one current sensor 42 have been shown in FIG. 1. As will be recognized by one of ordinary skill in the art, the present invention supports any number of switches and current sensors for protecting any number of wiring circuits.

Figure 2:
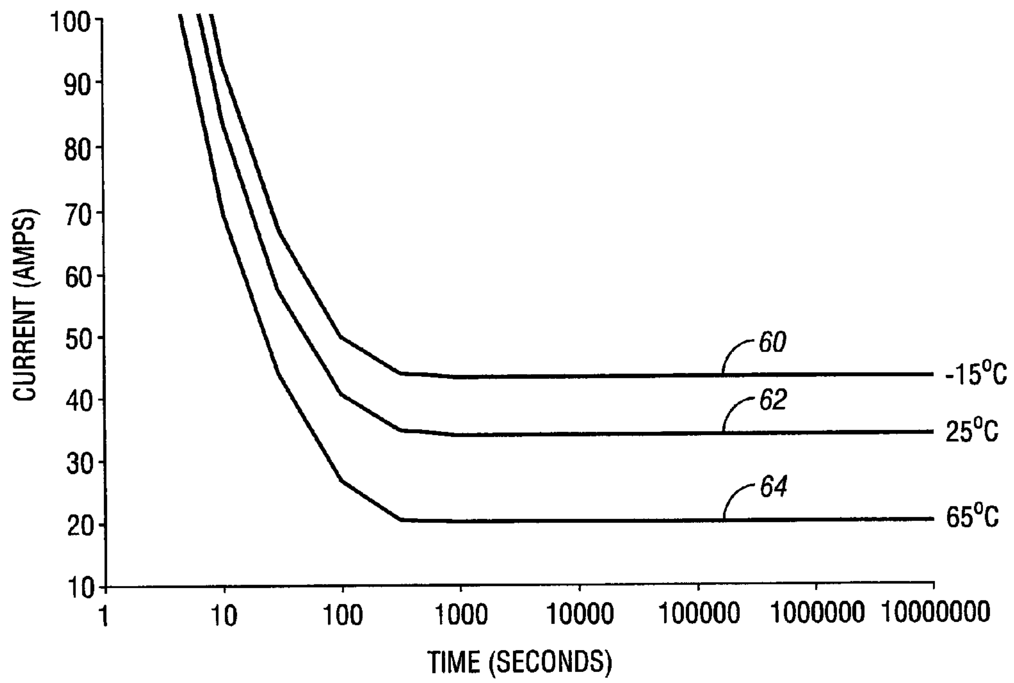
FIG. 2 is a graph illustrating the current carrying capability of wiring as applied by the present invention.

Referring now to FIG. 2, a graph illustrating the current carrying capability of wiring as applied by the present invention is shown. The current carrying capability of wiring is dependent upon a variety of factors, including the wire gauge, insulation type and thickness, connectors, routing, ambient conditions, and the like. Of particular concern is temperature, which may range between −40° C. and 85° C. in the interior of the vehicle and between −40° C. and 125° C. in the engine compartment. In FIG. 2, maximum current carrying ability for 14 AWG wire with PVC insulation is provided as a function of on-time for ambient temperatures of −15° C. (curve 60), 25° C. (curve 62), and 65° C. (curve 64).

Figure 3:
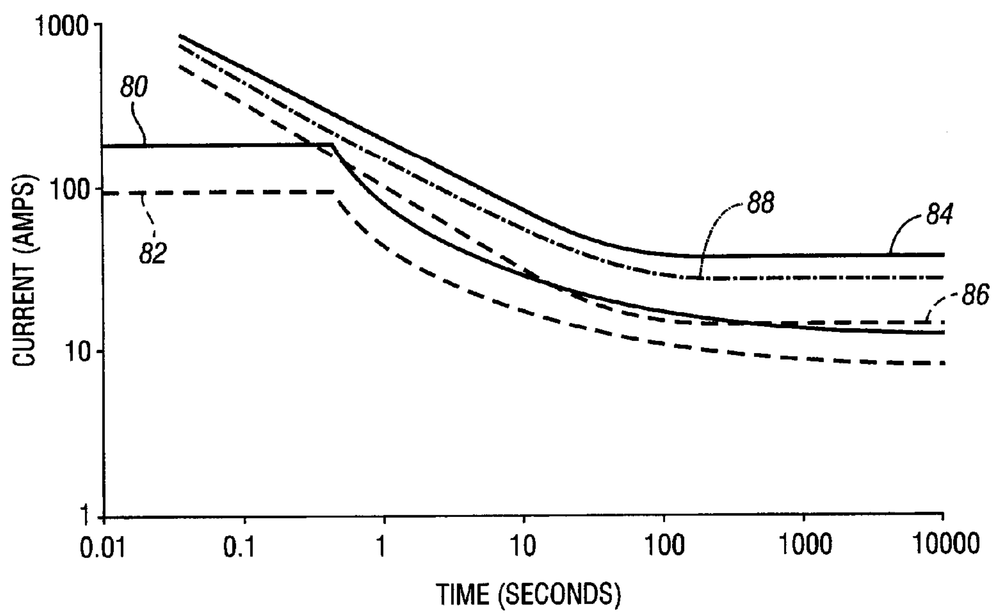
FIG. 3 is a graph illustrating current parameters as a function of time and temperature according to an embodiment of the present invention.

Referring now to FIG. 3, a graph illustrating current parameters as a function of time and temperature according to an embodiment of the present invention is shown. Maximum normal current draw characteristics as a function of time are provided for minimum expected temperature by plot 80 and for maximum expected temperature by plot 82. Similarly, plots showing the maximum allowed current in wiring as a function of time over which the current is applied are provided for minimum expected temperature by plot 84 and for maximum expected temperature by plot 86. Without taking ambient conditions into account, prudent practice dictates using plot 80 for establishing maximum current load draws and using plot 86 for wiring current limitations. Since plot 86 extends below plot 80, wiring with greater current carrying ability is required. One of the advantages of the present invention is that, by taking ambient temperature into account, less expensive wiring may be used to provide current to the load.

The present invention establishes a threshold level, shown in FIG. 3 as plot 88, which is based on the characteristics of the load and wiring. Moreover, threshold 88 is modified based on ambient conditions. In the example illustrated, threshold 88 is shifted upwards with decreasing ambient temperature and is shifted downwards with increasing ambient temperatures so as to lie between wiring limits 84, 86 and maximum expected load current draws 80, 82, respectively. When, for a given length of time since current has been applied, threshold 88 is exceeded, load current is interrupted.

Figure 4:
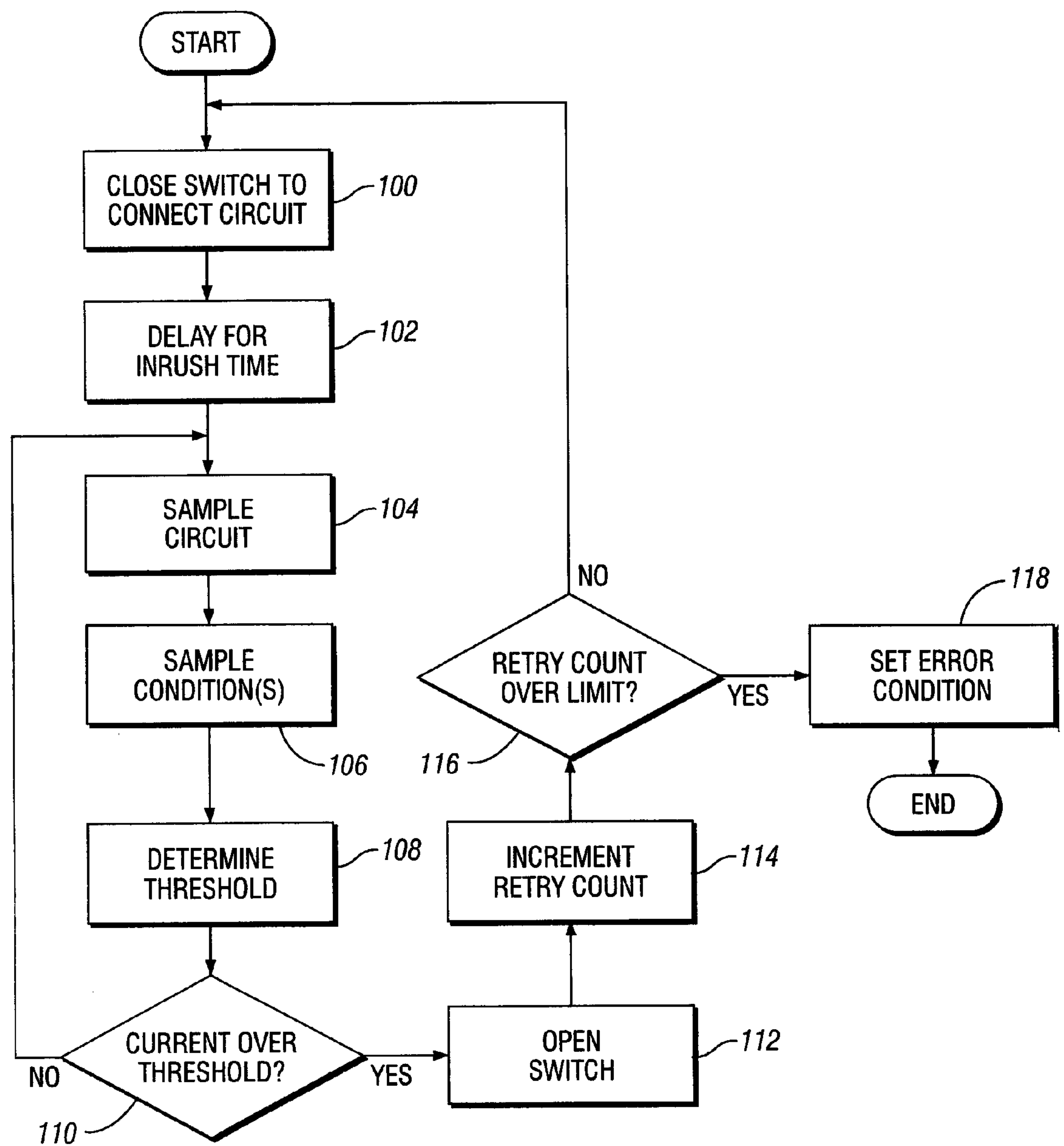
FIG. 4 is a flow diagram illustrating a method for monitoring current according to an embodiment of the present invention.

Referring now to FIG. 4, a flow diagram illustrating a method for monitoring current according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form merely for ease of illustration. Moreover, the present invention need not include every operation provided in the particular embodiment shown.

A switch is closed to connect a source of electrical power to a load, as in block 100. This allows current to flow between the source and the load through wiring interconnecting the source and the load. For some loads, such as certain electric motors, there is a brief inrush of very high current when the switch is first closed. Because this current is of such short duration that it is unlikely to damage the wiring, monitoring may be delayed for a brief period of time, as in block 102.

A current flowing through the wiring is sampled, as in block 104. One or more ambient conditions are sensed, as in block 106. A threshold is determined, as in block 108, based on the sampled ambient condition(s), as in block 108. The sampled current is compared to the threshold, as in block 110. If the current is less than the threshold, the current is again sampled, as in block 104. A delay may be inserted into the loop thus described. In addition, sampling ambient condition (s) and determining the threshold may be accomplished less frequently than sampling the current and comparing the sampled current to the threshold. Moreover, some or all of these operations may be performed at irregular intervals based on detecting a significant change in, for example, an ambient condition.

If the comparison of the sampled current exceeds and the threshold, as in block 110, results in the threshold being exceeded by the sampled current, the switch is opened, as in block 112. A retry count is incremented, as in block 114, and a check made to see if the retry count is over a preset limit, as in block 116. If not, the switch is closed again, as in block 100. If the number of allowed retries is exceeded, an error condition is set, as in block 118, and the switch remains open until a reset condition occurs. This reset condition may be turning the ignition key off and then on, may require entering a reset code, such as after examination by a technician, and the like. The retry count may be reset when a code is entered, each time the vehicle is started, after a preset length of time without incrementing, or the like. The retry count may also be decremented under various conditions such as, for example, the passage of time without having the sampled current exceed the threshold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system device for preventing an overcurrent condition in a vehicle having a power source and at least one electrical load powered by electrical current in wiring between the power source and the load, the system comprising:

a switch being configured to control a flow of the electrical current;

a temperature sensor for being positioned away from the switch, the temperature sensor configured to transmit a first temperature signal indicative of a first ambient temperature reading of one of an interior of the vehicle and an engine compartment of the vehicle, the first ambient temperature reading being substantially independent of a temperature of the switch; and a processor being configured to:

receive an electrical signal indicative of an amount of the electrical current flowing to the load;

receive the first temperature signal; and determine an overcurrent threshold based on a type of load to which the load belongs and on the first temperature signal.

2. The system of claim 1 wherein the processor is further configured to receive a second temperature signal indicative of a second ambient temperature reading of the one of the interior of the vehicle and the engine compartment of the vehicle from the temperature sensor.

3. The system of claim 1, wherein the second ambient temperature reading is substantially independent of the temperature of the switch.

4. The system of claim 1 wherein the first temperature signal is a value that is within a range of between −40 ° C. and 85 ° C.

5. The system of claim 1 wherein the first temperature signal is a value that is within a range of between −40 ° C. and 125 ° C.

6. The system of claim 1 wherein the processor is configured to control the switch to interrupt the flow of the electrical current to the load if the electrical signal is above the overcurrent threshold.

7. A device for preventing an overcurrent condition in a vehicle having at least one electrical load powered by electrical current, the device comprising:

a processor operably coupled to a switch that controls a flow of electrical current and to a temperature sensor that is positioned away from the switch, the temperature sensor is configured to transmit a first temperature signal indicative of a first ambient temperature reading of one of an interior of the vehicle and an engine compartment of the vehicle, the first ambient temperature reading being substantially independent of a temperature of the switch, and the processor being configured to:

receive an electrical signal indicative of an amount of the electrical current flowing to the load;

receive the first temperature signal; and determine an overcurrent threshold based on a type of load to which the load belongs and on the first temperature signal.

8. The device of claim 7 wherein the processor is further configured to receive a second temperature signal indicative of a second ambient temperature reading of the one of the interior of the vehicle and the engine compartment of the vehicle from the temperature sensor.

9. The device of claim 8 wherein the second ambient temperature reading is substantially independent of the temperature of the switch.

10. The device of claim 7 wherein the first temperature signal is a value that is within a range of between −40 ° C. and 85 ° C.

11. The device of claim 7 wherein the first temperature signal is a value that is within a range of between −40 ° C. and 125 ° C.

12. The device of claim 7 wherein the processor is configured to control the switch to interrupt the flow of the electrical current to the load if the electrical signal is above the overcurrent threshold.

13. A method for preventing an overcurrent condition in a vehicle having at least one electrical load powered by electrical current, the vehicle including a switch that controls a flow of electrical current and a temperature sensor that is positioned away from the switch, the method comprising:

receiving a first temperature signal indicative of a first ambient temperature reading of one of an interior of the vehicle and an engine compartment of the vehicle, the first ambient temperature reading being substantially independent of a temperature of the switch;

receiving an electrical signal indicative of an amount of the electrical current flowing to the load; and determining an overcurrent threshold based on a type of load to which the load belongs and on the first temperature signal.

14. The method of claim 13 wherein the first temperature signal is a value that is within a range of between −40 ° C. and 85 ° C.

15. The method of claim 13 wherein the first temperature signal is a value that is within a range of between −40 ° C. and 125 ° C.

16. The method of claim 13 further comprising controlling the switch to interrupt the flow of the electrical current to the load if the electrical signal is above the overcurrent threshold.

* * * * *

UNITED STATES PATENT AND TRADEMARK OFFICE

CERTIFICATE OF CORRECTION

PATENT NO. : 7,978,452 B2
APPLICATION NO. : 11/861588
DATED : July 12, 2011
INVENTOR(S) : David Anthony Hein It is certified that error appears in the above-identified patent and that said Letters Patent is hereby corrected as shown below:

Column 4, Line 61, Claim 41:

After “system” delete “device”.

Signed and Sealed this
Eighteenth Day of October, 2011

David J. Kappos
*Director of the United States Patent and Trademark Office*